Patented Apr. 23, 1940

2,198,202

UNITED STATES PATENT OFFICE 2,198,202

STABILIZING FOOD COMPOSITIONS

Sidney Musher, New York, N. Y., assignor to Musher Foundation Incorporated, New York, N. Y., a corporation of New York No Drawing. Application September 13, 1939, Serial No. 294,635

7 Claims. (Cl. 99—150)

The present invention relates to the preparation of new antioxygenic materials from readily available sources and having pronounced antioxygenic activity.

It is a purpose of the present invention to provide new antioxygenic materials that may be obtainable at low cost and with high potency for treatment particularly of glyceride oil containing food compositions and food compositions generally that are subject to oxidative deterioration.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accomplishing the above objects, it has been found that water and alcohol soluble extracts of the cereal grasses desirably in unbleached and dried condition, and particularly the grasses of the family known as Gramineae, in liquid or dried condition, or adsorbed or absorbed upon carriers such as sugar, salt, etc., may be added in small quantities of under 5% to oxidizable organic compositions and particularly to food compositions subject to oxidation in order to retard oxidative deterioration thereof. These cereal grasses include the leaves, stalks and stems of the plant and are distinguishable in appearance as well as in chemical composition from the cereal grains.

Of most importance for use in accordance with this invention are the cereal grasses produced from maize or corn, timothy, sorghum, rye, oat and wheat. Other cereal grasses that are included are June grass, red top, tall oat grass, orchard grass, meadow fescue, and Hungarian grass.

These cereal grasses, including the grass, leaves and stalks, normally contain between 65% and 85% total water which readily distinguishes them from the cereal grains. Moreover, the cereal grasses are principally used as feed for animals whereas the cereal grains are used principally as food for human beings.

The cereal grasses are high in fibres containing between 25% and 35% total fibrous material on their solids weight, whereas the cereal grains are low in fibrous material.

The average composition of a cereal grass before drying is as follows:

| | Per cent |
|---|---|
| Water | 72 |
| Protein | 2 |
| Fat | 1 |
| Nitrogen free extract | 15 |
| Fibre | 8 |
| Ash | 2 |

After drying, the average composition is as follows:

| | Per cent |
|---|---|
| Water | 11 |
| Protein | 7 |
| Fat | 2 |
| Nitrogen free extract | 45 |
| Fibre | 30 |
| Ash | 5 |

These cereal grasses may be utilized for extraction either in their undried state or after having been subjected to a drying operation. Where the cereal grasses are first dried before being extracted, the drying is preferably done at a temperature of substantially over 150° F. and preferably at a temperature of at least 250° F. or higher. Under the conditions of the heat treatment and during the drying of the cereal grass, the desired constituents of the cereal grass are retained to a greater degree and the grass may then be subjected to extraction.

For example, in drying, the cereal grass may be placed in a revolving cylinder having inside paddles to produce agitation and air may be blown over and through the grass, the heated air being at a temperature of approximately 1000° F. at the time it is introduced into the chamber.

This air is desirably run through the cereal grass while the latter is being agitated to produce a temperature in the cereal grass of substantially above 150° F. and until the moisture content is reduced from approximately 65% to 75% to approximately 7% to 18%.

The cereal grass in its wet state or the cereal hay after having been subjected to a drying operation is desirably finely divided before extraction, although the extract may be obtained from the cereal grass without subjecting such grass to a fine state of division by allowing the solvent such as water or alcohol to penetrate through the grass for a longer period of time.

The unbleached cereal grass such as corn grass may be mixed or agitated thoroughly with a quantity of water for from 10 seconds to 1 hour or more. The water used should be substantially free of minerals and desirably free of iron and copper.

Any quantity of water may be used to produce a free flowing mixture. For example, one part of corn grass may be mixed with 9 parts of water by weight. Other proportions may also be used such as from 5 to 25 parts of water to every 1 part of the cereal grass. The cereal grass-water suspension should then be subjected to thorough agitation, preferably for a period of about 30 minutes and at a slightly elevated temperature.

It is desirable for the temperature of the water at the time of extraction to be about 135° F. although room temperature is also satisfactory.

After a 30 minute agitation period, for example, the solution may be cooled where desired and the water soluble portion may be removed by filtration, centrifuging, siphoning or similar means. Where desired, the agitated mixture may be allowed to settle for from 2 to 12 hours or more until a clear supernatant liquid is formed which liquid is removed by decanting or siphoning.

The water used for extraction is desirably acidified to a pH of between about 4.5 and 6.7 and preferably to a pH of about 6 before subjecting to the extracting operation in order to obtain the maximum yield and the most potent antioxidant effects in the extracted material.

Where a higher proportion of total solids in the water is desired, a lesser amount of water may be used against the weight of the cereal grass or, where desired, the water containing the extracted material may be employed for a second extraction with an additional quantity of cereal grass until the desired amount of total solids is present in the water.

The clear solution thus obtained should desirably be evaporated by vacuum distillation at not over about 135° F. under 25 inches of vacuum, to approximately 25% to 75% total solids and desirably to about 70% solids and to a Baumé of 37°.

The evaporating temperature may vary, dependent upon whether vacuum or atmospheric pressure is used. Although it is desirable to use vacuum evaporation, evaporation at atmospheric pressure may also be employed.

The water extract thus obtained will vary in appearance dependent upon the cereal grass from which it is extracted although generally it is a dark brown product and contains water soluble carbohydrate material as well as a complex of organic materials including water soluble phosphorous and nitrogen compounds, all of which are essential in producing the desired antioxygenic effect.

Timothy, sorghum, and maize grass are the most desirable of the cereal grasses for extraction in accordance with this invention.

The water soluble extract of the cereal grasses thus obtained, and particularly using an acidified water for the extraction procedure, with the water substantially removed by vacuum distillation, may be added in relatively small quantities such as in amounts of less than 5% and desirably less than 2% to food compositions subject to oxidation in order to retard oxidation thereof as well as to other organic oxidizable compositions and particularly to glyceride oil containing compositions.

As little as 0.1% to 0.5% will usually give the desired antioxygenic effect dependent upon the oxidizable character of the composition that is to be treated.

For example, the water soluble extract of the cereal grasses may be added in a small proportion to dairy compositions and particularly to the aqueous phase of dairy products such as to the aqueous phase of milk, cream, ice cream, cream to be used in the manufacture of butter, cream cheese, evaporated milk, condensed milk, milk for powdering, etc. Even though the butterfat is present in the discontinuous phase of the butterfat emulsion and the water extract of the cereal grass is present in the aqueous continuous phase and is not dissolved in the oxidizable fat phase, nevertheless the discontinuous fat phase is substantially protected against oxidative deterioration.

The water extract may less desirably be utilized to retard oxidative deterioration of the straight glyceride oils such as the animal and vegetable fats and oils including lard, tallow, cod liver oil, herring oil, sardine oil, cottonseed oil, corn oil, soya bean oil, etc., whether in crude or refined condition or to be subsequently used for soap making, and including also mineral oil.

The water extract is, however, much more effective when added to the aqueous phase of an emulsion in which such oils are present. In other words, in the preparation of a cod liver oil emulsion, it is desirable to add the water extract of the cereal grass to the aqueous phase of the emulsion rather than to the cod liver oil itself.

The water extract may desirably be used for addition to a wide number of food compositions and particularly aqueous food compositions including beverages, such as orange and lemon and other citrus fruit drinks, ginger ale, cola drinks, essential oil food compositions, desserts, meat products including sausage, in the manufacture of canned soups and for use in other oil containing food compositions that are subject to the development of oxidized flavors and to deterioration as a result of oxidation.

The extract may also be used in curing operations including the curing of fish, meat, vegetables and fruits such as in the curing of herring, bacon, hams, mackerel, sardines, olives, apples, etc.

The extract may also desirably be applied in a minor proportion to the cereal grains, such as to oatmeal, corn meal, whole wheat biscuits, corn flakes and other oxidizable food compositions in order to retard oxidative deterioration thereof as well as to fortify such food compositions in nutritive and other values.

Where it is desired that the water soluble extracts be dried, the extract may be applied to a drum or roller for drying but this is not considered desirable in view of the fact that the water extract may become burnt on the surface of the roll.

Where a dried product is desirable, it is preferable to apply the extract to a carrier and to be dried together with that carrier. Among the most desirable carriers are sugar and salt but other carriers include powdered skim milk, starch, lime, calcium phosphate, bone black, cereal and seed flours such as oat flour, wheat flour, rye flour, soya flour, etc.

The concentrated water extract of the cereal grass is desirably applied to the carrier such as to salt or sugar in an amount ranging from 0.5% to 5% of the extract to from 99.5% to 95% of the carrier such as of salt or sugar. Other proportions may be used down to 50% of the extract to 50% of the carrier, although preferably a much larger proportion of the carrier is employed against the weight of the extract, particularly where the carrier containing the extract is being added to oxidizable food compositions in whole or in part replacement for the carrier which would normally be employed itself.

Where salt is used as a carrier, the extract may desirably be added to salt as it leaves the salt kiln and at a temperature of about 275° F. whereby the water remaining in the extract will be removed with the drying of the salt.

This extract may also be sprayed upon the salt in order to obtain complete absorption on the salt crystals while those crystals are at a temperature of about 180° F. and desirably at between 250° F. to 300° F. so that the extract dries on the surface of the crystals of the salt.

The desired amount of the water extract may also be applied to the salt crystals and absorbed on the surface of the salt crystals at lower temperatures and then the salt containing the extract may be subjected to an elevated temperature such as to over 180° F. either at atmospheric pressure or under reduced pressure until substantially all of the moisture originally contained in the extract has been evaporated off.

Where the extract is first substantially dried to dryness, the subsequent drying out procedures are not necessary, but it is considered desirable in order to obtain complete absorption of the extract on the surface of the salt crystals for the salt to be subjected to a drying operation and for the extract that is applied to the salt to be applied in substantially moistened condition.

The amount of cereal grass extract to be applied to the salt will depend largely upon the degree of stabilizing activity desired and also upon whether or not a uniform crystalline structure is desired in the preparation of the salt and dependent upon the use to which the salt is to be put.

Where sugar is employed as the carrier, the cereal grass extract may be added to the sugar crystals at the centrifugals in order to obtain complete surface coverage on the individual crystals of the sugar and to uniformly coat those crystals with the cereal grass extract.

The sugar containing the extract may be run through the centrifugals until the balance of the water has been removed from the extract and the sugar containing the cereal grass extract, present in approximately the same amounts as indicated in connection with salt, may be utilized as an antioxygenic sugar for retarding oxidative deterioration particularly of food compositions.

Salt or sugar as prepared in this manner will be markedly antioxygenic in character as compared with ordinary salt or sugar and even as compared with the cereal grass extracts themselves. When utilizing these combinations, there is obtained a marked enhancement in stabilizing activity which cannot be expected from the stabilizing activity of any of the individual component parts of this mixture. It is not known whether an actual chemical combination takes place or whether it is merely an absorptive phenomenon which occurs at the surface of the salt or sugar crystals or whether there is an interaction of a catalytic nature which results in the marked enhancement of stabilizing and antioxygenic activity.

Although these materials are not as effective when used with pure oils and fats such as with the essential oils, glyceride oils and hydrocarbon oils, they are extremely effective when used in aqueous materials and aqueous compositions which may contain oil globules in the discontinuous phase thereof. Under these circumstances there is obtained extremely marked protection to the oil or fat phase even though the cereal grass water extract is added to the aqueous phase.

The salt-cereal grass extract combination may therefore be very desirably utilized in brining and curing operations and particularly in the brining and curing of meat products, such as bacon, hams, pork, mutton, fat backs, etc., fishery products such as mackerel, sardines, salmon, tuna fish, fish livers, etc., fruits such as apples, peaches, pineapples, pears, olives, etc., and similar food compositions.

For such brining and curing operations, the salt-cereal grass extract may be used in any desired proportion such as in an amount of from 2% of the salt-cereal grass extract combination to a fully concentrated solution in the water to be used in the brining operation.

Where the salt-cereal grass extract combination is not dissolved in water but is used in dry form for the curing or brining treatments, it may be employed in an amount ranging from 0.05% to 50% against the weight of the food composition which is to be protected against oxidative deterioration. Generally, for curing and brining treatments, as little as 15% or less of the salt-cereal grass extract combination against the total weight of the fish, meat, or similar food composition will be sufficient to give desired antioxygenic protection.

When the salt-cereal grass extract combination is utilized in such brining operations, it is not only more effective than the ordinary untreated salt, but is, in addition, more effective than the original cereal grass from which the extract is removed.

In the case of salt or cured fishery and meat products such as salt mackerel, salt herring, cured bacon, etc., the product may be held for a first curing period of up to 30 days in a brine or curing mixture containing the water extract and then completely repacked by washing off or otherwise removing all of the stabilizing salt-cereal grass extract material, and the protective effect will nevertheless be retained over the entire storage period. Repacking in fresh salt or brine may, where desired, not be resorted to and the efficiency of the extract will in full be retained to a far greater degree than if the original unextracted cereal grass had been employed with salt instead of the extract.

Where sugar is used as the carrier, the sugar containing the cereal grass extract may be employed in partial or complete replacement for ordinary sugar used in the manufacture of ice cream, sherbets, ices, beverages, jams, jellies, desserts, candies and confections and other food compositions normally containing sugar, whereby marked retardation of oxidation will be obtained.

Even the cereal grains themselves such as oatmeal, corn meal, corn flakes, wheat flakes, toasted whole wheat biscuits and other prepared cereals may be substantially protected against oxidative deterioration and their original vitamin content may be substantially retained and enhanced by adding thereto small amounts such as from 0.05% to 5% by weight of the cereal grass extracts referred to herein.

Where desired, the cereal grass extract may be added to the cereal before the final processing such as before any final roasting or drying out operation and thoroughly admixed therewith. It is desirable for the cereal grass extract to be thoroughly admixed with the cereal or cereal flour with which it is used in order to retard oxidative deterioration thereof.

The cereal grass extract may also be added to a cereal such as oatmeal, for example, by spraying the undried extract on the cereal and then drying, whereby each individual particle of the cereal is contacted with and carries the cereal grass extract.

The extracts of the cereal grasses employed in this manner may be utilized without substantially changing the normal characteristics or appearance or flavor of the food compositions with which they are used although marked protection against oxidative deterioration is obtained. The development of oxidized flavors in milk or cream may, for example, be substantially retarded by adding thereto from 0.02% to 0.2% by weight of the concentrated water extract of maize grass as indicated from the following experiment.

Milk that was susceptible to the development of oxidized flavors was treated in the following manners:

A. Untreated.

B. There was added to the milk 0.05% by weight of the concentrated water extract of dried maize grass. This concentrated water extract was prepared by extracting 1 part of the maize grass by weight with 5 parts by weight of water adjusted in acidity to a pH of 5.5, the extraction having been conducted at 135° F. for 30 minutes, at the end of which time the water soluble portion was removed by filtration and the water evaporated in a stainless steel vacuum pan at a temperature of 135° F. and under 25 inches of vacuum to an extract having 70% total solids.

The milks were examined for oxidized flavor, the number of plus signs indicating the degree of oxidized flavor.

|  | Oxidized flavor after— | | |
| --- | --- | --- | --- |
|  | 24 hours | 48 hours | 72 hours |
| Milk A | + | ++ | ++++ |
| Milk B | − | − | ++ |

In place of water as the solvent for extracting the antioxygens from the unbleached cereal grasses, there may be employed other similar solvents and particularly the alcohols, including methyl, ethyl, butyl and propyl alcohol, glycerol, the glycols and glycol ethers and other solvents having the formula XOH where X is a low molecular weight aliphatic group.

The cereal grass may be immersed in and thoroughly admixed with the alcohol by using about 1 part of the cereal grass to 5 to 10 parts by weight of the alcohol, mixing thoroughly at a slightly elevated temperature such as at about 110° F., removing the undissolved cereal grass residues and then evaporating off the alcohol soluble portion, preferably under reduced pressure, in order to leave the alcohol soluble portion in substantially concentrated form.

The alcohol may, where desired, be used as a solvent together with water so that, for example, a mixture may be prepared using from 20% to 80% by weight of alcohol to from 80% to 20% by weight of water.

Desirably the alcohol or water-alcohol mixture is slightly acidified to a pH of between 4.5 and 6.7 and preferably to a pH of about 6 before extracting the cereal grass.

The alcohol soluble portion may be used in a similar manner to the water soluble extract and may be used either alone for addition to oxidizable food compositions or may be added with a carrier such as with salt, sugar, cereal flour, starch, skim milk, etc., for drying with and absorption upon that carrier before application to the oxidizable food composition.

It is not desirable for the cereal grass before extraction to have been subjected to any boiling, fermentation, malting, sprouting, peptizing, causticizing or dextrinizing operations.

The alcohol soluble extract contains carbohydrates as in the case of the water soluble extract. These water soluble carbohydrates may be difficult to disperse and it may be necessary to put the alcohol soluble extract through a grinding operation in order to disperse the carbohydrate material throughout the body of the extract to make the extract more readily utilizable for addition to an organic composition to be protected against oxidative deterioration.

The water and alcohol soluble extracts are both substantialy free of fibrous materials and contain water soluble sugars and carbohydrates which appear to be necessary to produce the desired antioxygenic effect.

These extracts possess the unusual property of having their antioxygenic activity materially increased by being subjected to an elevated temperature at the time of use in connection with the material requiring stabilization. Where, for example, the concentrated water or alcohol soluble extract of the cereal grass is added to the food composition and then subjected to a temperature of in excess of 150° F. and desirably to in excess of 215° F., a marked increase in stabilizing effect is observed even though it is normally to be expected that a decrease in stabilizing action would be obtained.

It is not desirable, nor is the desired effect obtained, to heat the concentrated extract itself and then add such heated extract to the oxidizable food composition. When the extract is heated alone, substantially no improvement is obtained over the unheated extract and frequently a reduction in antioxygenic activity is observed.

Under these conditions the cereal grass extract may be added to a food composition, such as to milk, cream or other dairy product, to meat products, citrus fruit juices, beverages, desserts, candies, bakery goods, etc., and then those products subjected to an elevated temperature in order for the antioxygenic effect to be materially enhanced.

The residues obtained following the extraction of the cereal grasses may be utilized for ordinary animal feed purposes. For example, following the alcoholic extraction of the timothy grass, the residue may be substantially dried to remove all the excess solvent and such residues may be utilized in ordinary animal feeding compositions in view of the fact that they still contain good feed value.

In the corn or maize grasses that may be utilized for extraction purposes are included the various forms of corn fodder such as shock corn, corn stover and corn cobs. In the cereal grasses there are also included the unbleached cereal grass straws such as wheat straw, rye straw, barley straw, buckwheat straw, etc.

The water and alcohol soluble extracts of the cereal grass may also be added to oxidizable animal feed compositions and particularly to those containing oxidizable oils such as cod liver oil, herring oil, fish meals, etc., in order to retard oxidative deterioration thereof as well as to increase their nutritive and other properties. These extracts may also be added to other cereal grasses and forage legumes in order to retard their loss of vitamin A during subsequent storage.

Where the cereal grasses are dried to hays before being subjected to water or alcohol soluble extraction, they may desirably be treated with sugar and a phosphatide or phosphoric acid, for example, and then subjected to an elevated temperature during drying as substantially brought out in co-pending application, Serial No. 269,913 filed April 25, 1939.

This application is a continuation in part of co-pending application Serial No. 135,169 filed April 5, 1937.

By the expression "cereal grass" as used in the appended claims there is not included the grains themselves such as oats, maize and barley, but only the leaves, stalks and stems of the cereal plants as referred to earlier in this application.

Having described my invention, what I claim is:

1. A process of stabilizing an organic material susceptible to oxidation which comprises adding thereto a small amount, less than 5%, of the fibre free antioxygens extracted from unbleached cereal grasses, said extract being selected from the group consisting of the water and alcohol soluble extracts, and then heating to at least 215° F.

2. A process of stabilizing a food composition susceptible to oxidation which comprises adding thereto and mixing therewith a relatively small proportion, less than 5%, of the antioxygens extracted from unbleached cereal grasses, said extract being substantially fibre free and being selected from the group consisting of the water and alcohol soluble extracts, and then heating to at least 215° F.

3. A process of stabilizing an organic material susceptible to oxidation which includes the steps of mixing an unbleached cereal grass in a relatively large volume of a solvent selected from the group consisting of slightly acidified water and alcohol, holding the mixture of the cereal grass and solvent until the soluble antioxygens in said cereal grass have been substantially taken into solution, removing the undissolved fibres and cereal grass residues, concentrating the antioxygenic extract and adding a small amount, less than 5%, of said extract to the organic material, and then heating to at least 150° F. whereby the organic material is stabilized against oxidative deterioration.

4. A process of stabilizing a food composition susceptible to oxidation which comprises adding thereto a small amount, less than 5%, of the fiber free antioxygens extracted with water from the unbleached cereal grasses, and then heating to at least 150° F.

5. A process of stabilizing a food composition susceptible to oxidation which comprises adding thereto a relatively small proportion, less than 5%, of the fiber free antioxygens extracted from unbleached cereal grasses, said extract being selected from the group consisting of the water and alcohol soluble extracts, and then heating to in excess of 150° F.

6. A process of stabilizing an organic material susceptible to oxidation which comprises adding thereto a relatively small proportion, less than 5%, of the fiber free concentrated water extract of unbleached cereal grasses, the water used for extracting having a pH between 4.5 and 6.7, and then heating to at least 150° F.

7. A process of stabilizing a food composition susceptible to oxidation which comprises adding thereto a small proportion, less than 5%, of the antioxygens extracted from maize grass, said extract being substantially fiber free and being selected from the group consisting of the water and alcohol soluble extracts, and then heating to at least 150° F.

SIDNEY MUSHER.